US008706418B2

(12) United States Patent
Ross et al.

(10) Patent No.: US 8,706,418 B2
(45) Date of Patent: Apr. 22, 2014

(54) METHODS AND SYSTEMS FOR TESTING NAVIGATION ROUTES (71) Applicant: Ford Global Technologies, LLC, Dearborn, MI (US)

(72) Inventors: Joseph N. Ross, Ypsilanti, MI (US); Micah J. Kaiser, Sterling Heights, MI (US); Nello Joseph Santori, Canton, MI (US); David P. Boll, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/719,639

(22) Filed: Dec. 19, 2012

(65) Prior Publication Data

US 2013/0116924 A1 May 9, 2013

Related U.S. Application Data (63) Continuation of application No. 12/544,635, filed on Aug. 20, 2009, now Pat. No. 8,364,402.

(51) Int. Cl.
*G01C 21/34* (2006.01)
(52) U.S. Cl.
USPC .......................................... 701/533; 701/400
(58) Field of Classification Search
USPC ................... 701/400, 527, 468, 466, 26, 533; 340/988
See application file for complete search history.

(56) References Cited

U.S. PATENT DOCUMENTS

| 5,781,125 | A  | 7/1998 | Godau et al. |
| 5,922,041 | A  | 7/1999 | Anderson |
| 6,064,322 | A  | 5/2000 | Ohira |
| 6,337,621 | B1 | 1/2002 | Ogino et al. |
| 6,356,839 | B1 | 3/2002 | Monde et al. |
| 6,434,455 | B1 | 8/2002 | Snow et al. |

(Continued)

FOREIGN PATENT DOCUMENTS

| EP | 0808492 | 8/1996 |
| JP | 9264819 | 10/1997 |
| JP | 11326140 | 11/1999 |
| JP | 2006018680 | 1/2006 |

OTHER PUBLICATIONS

"Drew Tech gets you on the Bus", article printed from www.drewtech.com, Dec. 16, 2009.

(Continued)

*Primary Examiner* — Yonel Beaulieu
(74) *Attorney, Agent, or Firm* — Jennifer M. Stec; Brooks Kushman P.C.

(57) ABSTRACT

Various embodiments may include a method and system for testing data defining one or more navigation routes. A starting location may be input at a computer remote from the starting location. A destination location may also be input. Map data including GPS information based on the starting location input and the destination location input may be received. Route data may also be received. Based on the map data and the route data, data defining one or more navigation instructions may be generated for one or more routes. The one or more navigation instructions may be executed at the computer and compared to the map data. Based on the comparison, an accuracy of the navigation instructions may be determined. The data defining the navigation instructions may be corrected if the data is determined to be inaccurate.

6 Claims, 8 Drawing Sheets

(56) References Cited

U.S. PATENT DOCUMENTS

| | | |
|---|---|---|
| 6,553,292 B2 | 4/2003 | Kokes et al. |
| 6,598,183 B1 | 7/2003 | Grieco et al. |
| 6,603,394 B2 | 8/2003 | Raichle et al. |
| 6,611,740 B2 | 8/2003 | Lowrey et al. |
| 6,636,790 B1 | 10/2003 | Lightner et al. |
| 6,687,587 B2 | 2/2004 | Kacel |
| 6,738,697 B2 | 5/2004 | Breed |
| 6,778,888 B2 | 8/2004 | Cataldo et al. |
| 6,978,198 B2 | 12/2005 | Shi |
| 7,146,307 B2 | 12/2006 | Mocek |
| 7,155,321 B2 | 12/2006 | Bromley et al. |
| 7,209,490 B2 | 4/2007 | Isaac et al. |
| 7,228,211 B1 | 6/2007 | Lowrey et al. |
| 7,232,962 B2 | 6/2007 | Rynd |
| 7,277,780 B2 | 10/2007 | Meier-Arendt et al. |
| 7,340,365 B2 | 3/2008 | Wubbena et al. |
| 7,343,526 B2 | 3/2008 | Aditham |
| 7,356,394 B2 | 4/2008 | Burgess |
| 7,366,934 B1 | 4/2008 | Narayan et al. |
| 7,379,541 B2 | 5/2008 | Iggulden et al. |
| 7,487,074 B2 | 2/2009 | Ohtsu et al. |
| 7,493,209 B1 | 2/2009 | Altrichter et al. |
| 7,522,995 B2 | 4/2009 | Nortrup |
| 7,532,962 B1 | 5/2009 | Lowrey et al. |
| 7,590,476 B2 | 9/2009 | Shumate |
| 7,905,815 B2 | 3/2011 | Ellis et al. |
| 7,983,839 B2 | 7/2011 | Sutardja |
| 8,024,111 B1 | 9/2011 | Meadows et al. |
| 8,103,443 B2 | 1/2012 | Kantarjiev et al. |
| 8,126,644 B2 | 2/2012 | Amano |
| 8,140,358 B1 | 3/2012 | Ling et al. |
| 8,185,299 B2 | 5/2012 | Fujiwara et al. |
| 8,219,249 B2 | 7/2012 | Harrod et al. |
| 8,285,439 B2 | 10/2012 | Hodges |
| 8,315,802 B2 | 11/2012 | Brown |
| 8,364,402 B2 * | 1/2013 | Ross et al. ............... 701/534 |
| 8,390,473 B2 | 3/2013 | Krzyzanowski et al. |
| 8,392,105 B2 | 3/2013 | Desborough |
| 2002/0035429 A1 | 3/2002 | Banas |
| 2002/0173885 A1 | 11/2002 | Lowrey et al. |
| 2003/0034769 A1 | 2/2003 | Lipscomb et al. |
| 2003/0036832 A1 | 2/2003 | Kokes et al. |
| 2003/0163587 A1 | 8/2003 | Knight et al. |
| 2004/0024502 A1 | 2/2004 | Squires et al. |
| 2004/0044454 A1 | 3/2004 | Ross et al. |
| 2004/0054503 A1 | 3/2004 | Namaky |
| 2004/0093134 A1 | 5/2004 | Barber et al. |
| 2004/0128071 A1 | 7/2004 | Schradi |
| 2004/0172177 A1 | 9/2004 | Nagai et al. |
| 2004/0194479 A1 | 10/2004 | Umebayashi et al. |
| 2004/0218894 A1 | 11/2004 | Harville et al. |
| 2005/0090939 A1 | 4/2005 | Mills et al. |
| 2005/0096020 A1 | 5/2005 | Oesterling |
| 2005/0097541 A1 | 5/2005 | Holland |
| 2005/0192724 A1 | 9/2005 | Hendry |
| 2005/0281414 A1 | 12/2005 | Simon et al. |
| 2006/0034231 A1 | 2/2006 | Tailor |
| 2006/0041348 A1 | 2/2006 | Liebl et al. |
| 2006/0130033 A1 | 6/2006 | Stoffels et al. |
| 2006/0132291 A1 | 6/2006 | Dourney, Jr. et al. |
| 2006/0155437 A1 | 7/2006 | Wang et al. |
| 2006/0229777 A1 | 10/2006 | Hudson et al. |
| 2006/0253235 A1 | 11/2006 | Bi et al. |
| 2007/0121959 A1 | 5/2007 | Philipp |
| 2007/0162796 A1 | 7/2007 | Chan et al. |
| 2007/0171029 A1 | 7/2007 | Inbarajan |
| 2007/0179799 A1 | 8/2007 | Laghrari |
| 2008/0015748 A1 | 1/2008 | Nagy |
| 2008/0027605 A1 | 1/2008 | Oesterling |
| 2008/0027606 A1 | 1/2008 | Helm |
| 2008/0082226 A1 | 4/2008 | Amador et al. |
| 2008/0140281 A1 | 6/2008 | Morris et al. |
| 2008/0147267 A1 | 6/2008 | Plante et al. |
| 2008/0162033 A1 | 7/2008 | Wagner et al. |
| 2008/0167056 A1 | 7/2008 | Gilzean et al. |
| 2008/0167078 A1 | 7/2008 | Eibye |
| 2008/0172357 A1 | 7/2008 | Rechis et al. |
| 2008/0216067 A1 | 9/2008 | Viling |
| 2008/0269975 A1 | 10/2008 | Bertosa et al. |
| 2009/0063038 A1 | 3/2009 | Shrivathsan et al. |
| 2009/0063045 A1 | 3/2009 | Figueroa et al. |
| 2009/0143937 A1 | 6/2009 | Craig |
| 2009/0177352 A1 | 7/2009 | Grau et al. |
| 2009/0210145 A1 * | 8/2009 | Amano ............... 701/201 |
| 2009/0276115 A1 | 11/2009 | Chen |
| 2009/0292416 A1 | 11/2009 | Ubik et al. |
| 2009/0308134 A1 | 12/2009 | Pepper |
| 2009/0326757 A1 | 12/2009 | Andreasen et al. |
| 2009/0326991 A1 | 12/2009 | Wei et al. |
| 2010/0042287 A1 | 2/2010 | Zhang et al. |
| 2010/0042288 A1 | 2/2010 | Lipscomb et al. |
| 2010/0056055 A1 | 3/2010 | Ketari |
| 2010/0204878 A1 | 8/2010 | Drew et al. |
| 2010/0245123 A1 | 9/2010 | Prasad et al. |
| 2010/0246846 A1 | 9/2010 | Burge et al. |
| 2010/0256861 A1 | 10/2010 | Hodges |
| 2010/0262335 A1 | 10/2010 | Brozovich |
| 2011/0022422 A1 | 1/2011 | Taylor |
| 2011/0041088 A1 | 2/2011 | Mason et al. |
| 2011/0046883 A1 | 2/2011 | Ross et al. |
| 2011/0190962 A1 | 8/2011 | Peterson et al. |
| 2011/0225096 A1 | 9/2011 | Cho et al. |
| 2011/0258044 A1 | 10/2011 | Kargupta |
| 2011/0276218 A1 | 11/2011 | Dwan et al. |
| 2011/0276219 A1 | 11/2011 | Swaminathan et al. |
| 2012/0029762 A1 | 2/2012 | Ubik et al. |
| 2012/0030512 A1 | 2/2012 | Wadhwa et al. |
| 2012/0053782 A1 | 3/2012 | Gwozdek et al. |
| 2012/0072055 A1 | 3/2012 | Barlsen et al. |
| 2012/0075092 A1 | 3/2012 | Petite et al. |
| 2012/0294238 A1 | 11/2012 | Uhler |

OTHER PUBLICATIONS

Kermit Whitfield, "A hitchhiker's guide to the telematics ecosystem", Automotive Design & Production, Oct. 2003, http://findarticles.com, pp. 1-3.
Dynetics Vehicle Data Recorder Models DVG-II and WDVG-II printout from www.dynetics-ia.com.
Integrated Diagnostic System (IDS), Ford, Lincoln, Mercury.
Introduction to J2534 and Flash Reprogramming, Drew Technologies, Copyright 2009.
Pegisys PC Diagnostic System, PC-based J2534 Reprogramming & Scan Tool, printed from www.otctools.com.
Software, Pass Thru Pro II, J2534 Flash Reprogramming, printed from buy1.snapon.com, Dec. 3, 2009.
SYNC Navigation System (Jul. 2007).
SYNC Navigation System (Jul. 2009).
SYNC Navigation System (Oct. 2008).
SYNC Supplemental Guide (Oct. 2008).
SYNC Supplemental Guide (Aug. 2009).
SYNC Supplemental Guide (Nov. 2007).
The CarDAQ-Plus Advantage, Drew Technologies, Inc.

* cited by examiner

METHODS AND SYSTEMS FOR TESTING NAVIGATION ROUTES

CROSS-REFERENCE TO RELATED APPLICATIONS

This application is a continuation of U.S. application Ser. No. 12/544,635 filed Aug. 20, 2009, now issued U.S. Pat. No. 8,364,402, issued on Jan. 29, 2013, the disclosure of which is incorporated in its entirety by reference herein.

TECHNICAL FIELD

Embodiments of the present invention relate generally to technology for generating and testing navigation routes.

BACKGROUND

U.S. Pat. No. 5,922,041, issued to Anderson, discloses a navigation simulator and recorder that includes a computer and several position and attitude determining devices installed in a vehicle driven along a test route. The data from the position and attitude determining devices is stored in the computer while the vehicle is driven along the test route. The recorded data from the test drive is subsequently utilized to test a navigation system. The output of the navigation system under test is monitored to determine its response to the real time recorded data.

US Publication No. 2004/0128071 to Schradi discloses constructing or calculating a GPS simulation scenario for simulating a reality driving experiment along a pre-specified itinerary. The method includes providing a digitized map data set comprising a geographical region pertaining to the itinerary. The data set includes data regarding static environmental features that are present along the itinerary. The method further includes providing dynamic and/or static positional and transmittal data regarding GPS satellites that are potentially relevant for determining a GPS-based position along the itinerary. A starting time instant and geographical starting and destination positions of the itinerary are specified. Furthermore, various vehicle routes based on a digitized map data set are calculated. From the calculated routes, various sets of vehicle node positions and associated time instants along the itinerary are determined. From the dynamic and/or static positional and transmittal data regarding GPS satellites and the static environmental features present along the itinerary, various instantaneous GPS quality metrics are calculated. Additionally, based on the various GPS quality metrics and associated time instants, an overall GPS performance data quantity pertaining to the itinerary is calculated.

U.S. Pat. No. 7,487,074, issued to Ohtsu et al., discloses a road traffic simulation apparatus that expresses a plurality of mobile units and road traffic environments on a computer to simulate traffic situations in association with a plurality of mobile units. Each of the mobile units is expressed by a combination of a driver model, a model of driving operations of a virtual driver, and a vehicle dynamics model, a model of physical behaviors of a mobile unit. The mobile units are programmed to travel independently to each other in a road traffic environment that is expressed on the computer.

SUMMARY

One aspect is a method for testing data defining one or more navigation routes. The method may include inputting at a computer one or more starting locations remote from a location of the computer and inputting at the computer one or more destination locations. The starting location and the destination location may be in the same or different geographical vicinities. Furthermore, the starting location may be different than the location of the computer. Non-limiting examples of a starting location input and a destination location input may include a full address, a city, a zip code, cross streets, or a point of interest (POI).

In one embodiment, the destination location may be input using a spoken language.

The method may further include receiving map data (e.g., GPS information) for one or more geographical vicinities. The map data may be received from an Internet mapping application. Furthermore, the map data may be based on the starting location and the destination location. Route data may also be received at the computer.

The method may further include using the computer to generate data defining one or more navigation instructions for one or more routes based on the map data and the route data. The navigation instructions for testing the navigation instruction data may be executed at the computer.

The method may further include comparing the executed navigation instructions to the map data and determining an accuracy of the navigation instructions based on the comparison. The method may further include correcting the data defining navigation instructions if the data is determined to be inaccurate.

A second aspect is a system for testing data defining one or more navigation routes. The system may include at least one computer operably configured with executable instructions to receive input defining a starting location and a destination location. The input(s) may be from at least one of a keyboard, mouse, or microphone.

The at least one computer may be further configured to receive map data including GPS information for one or more geographical vicinities. The at least one computer may be configured to receive the map data from the Internet. The map data may be based on the starting location input and the destination location input.

The at least one computer may be further configured to receive route data including a route from the starting location to the destination location. The at least one computer may be further configured to generate one or more navigation instructions for one or more routes based on the map data and the route data.

The at least one computer may be further configured to execute the one or more navigation instructions for testing the navigation instruction data. The at least one computer may be further configured to execute instructions for comparing the executed navigation instructions to the map data. Additionally, the at least one computer may be further configured to determine an accuracy of the navigation instructions based on the comparison. Furthermore, the at least one computer may be configured to correct one or more navigation instructions determined to be inaccurate.

The system may further include a nomadic device communicating with the at least one computer over a telecommunications network. The at least one computer may be further configured to receive the route data over the telecommunications network.

The system may further include a service delivery network in wireless communication with the at least one computer.

In one embodiment, the navigation instructions may be text-based instructions. The at least one computer may be further configured to convert the text-based navigation instructions to speech. The at least one computer may be further configured to output the one or more navigation instructions in a spoken language.

In one embodiment, the starting location input or the destination location input may be speech-based inputs. The at least one computer may be further configured to convert the speech-based inputs to text. Additionally, the at least one computer may be further configured to transmit the text-based inputs to a routing engine to receive the route data.

The at least one computer may be further configured to display a virtual vehicle for executing the one or more navigation instructions. The at least one computer may be further configured to receive one or more inputs defining a control of the virtual vehicle. The one or more inputs may define a steering control of the virtual vehicle and/or a speed of the virtual vehicle.

The at least one computer may be further configured to store the executed navigation instructions. Additionally, the at least one computer may be further configured to retrieve the navigation instructions from the computer as input defining the one or more starting locations.

A third aspect includes a method in which a starting and destination location is input to a computerized vehicle navigation system. The method may further include receiving at the vehicle navigation system route and GPS information based on the starting and destination location. The method may further include inputting vehicle control signals for simulating a vehicle's travel. The method may further include receiving navigation instructions from the navigation system based on the vehicle's travel. Additionally, the method may include comparing the navigation instructions to map information to validate the navigation instructions.

In one embodiment, the method may further include changing a vehicle route and receiving the navigation instructions based on the change in route. The method may further include comparing the change in route to the map information to validate the navigation instructions.

These and other aspects of the present invention will be better understood in view of the attached drawings and following detailed description of the invention.

BRIEF DESCRIPTION OF THE DRAWINGS

The figures identified below are illustrative of some embodiments of the present invention. The figures are not intended to be limiting of the invention recited in the appended claims. Embodiments of the present invention, both as to their organization and manner of operation, together with further object and advantages thereof, may best be understood with reference to the following description, taken in connection with the accompanying drawings, in which:

DETAILED DESCRIPTION

Detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
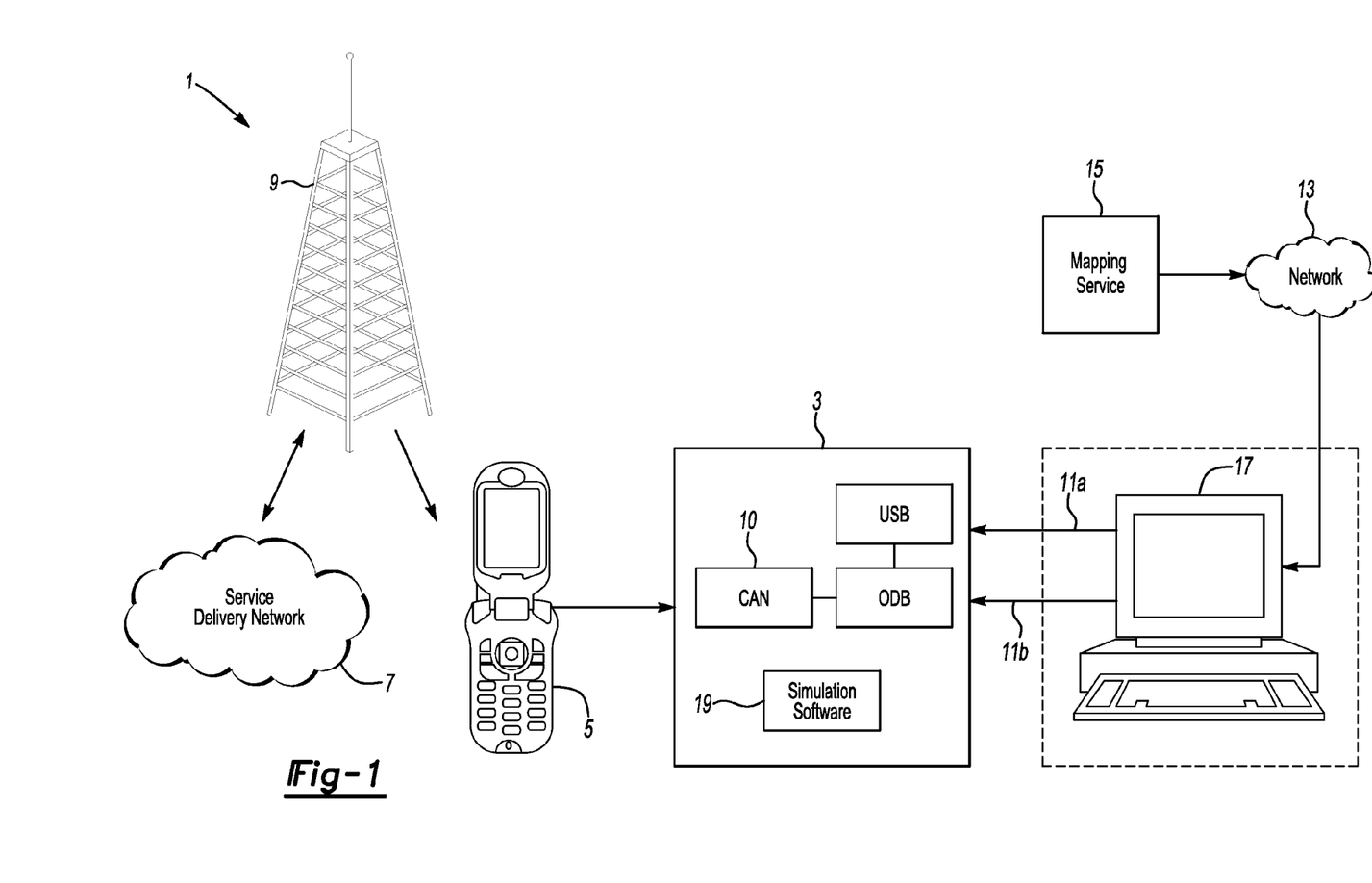
FIG. 1 shows a system for testing navigation routes according to one of the various embodiments.

FIG. 1 illustrates an exemplary system for validating a navigation route. The disclosure of FIG. 1 may be modified or re-arranged to best fit a particular implementation of the present invention. Certain aspects of FIG. 1 will also be described with respect to FIGS. 2 and 3.

Module 3 may include a simulated vehicle computing system. The simulated vehicle computing system 3 may simulate the features of an actual vehicle computing system including, but not limited to, receipt of voice-activated commands, transmission of spoken responses to the commands, generation and transmission of directions, communication with one or more peripheral items (e.g., and without limitation, nomadic communication devices and media players), generating wireless connections with one or more devices inside (e.g., using BLUETOOTH) and outside (e.g., via an Internet connection) of the vehicle, among other features. Additional features will be described below with respect to FIG. 2.

Furthermore, the simulated vehicle computing system 3 may also simulate communication with a vehicle. For example, and without limitation, simulated vehicle computing system 3 may include a CPU (not shown) and a simulated vehicle data bus 10 (e.g., and without limitation CAN, J1850, and GMLAN). It may also include a simulated on-board diagnostics system (e.g., OBD-I or OBD-II). Other aspects of FIG. 1 are described below.

Figure 2:
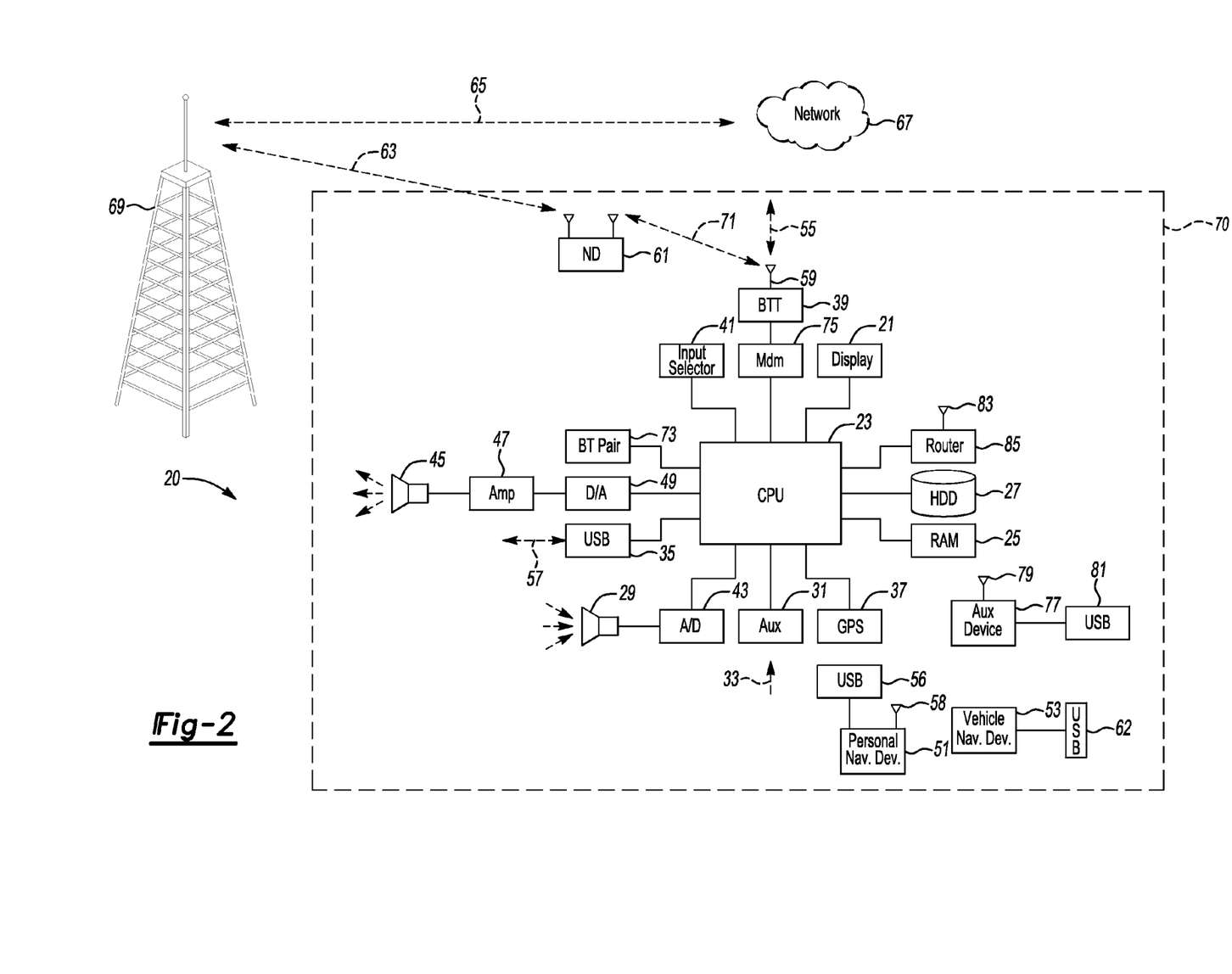
FIG. 2 shows a vehicle computing system which may be simulated for testing navigation routes according to one of the various embodiments.

FIG. 2 illustrates an exemplary vehicle computing system 20, one or more of the features of which the simulated vehicle computing system 3 may simulate. The disclosure of FIG. 2 may be modified or re-arranged to best fit a particular implementation of the present invention. A vehicle enabled with a vehicle-based computing system may contain a visual front end interface 21 located in the vehicle. The user may also be able to interact with the interface if it is provided, for example, with a touch sensitive screen. In another illustrative embodiment, the interaction occurs through, button presses, audible speech and speech synthesis.

In the illustrative embodiment, a processor 23 controls at least some portion of the operation of the vehicle-based computing system. Provided within the vehicle, the processor 23 allows onboard processing of commands and routines. Further, the processor 23 is connected to both non-persistent 25 and persistent storage 27. In this illustrative embodiment, the non-persistent storage is random access memory (RAM) and the persistent storage is a hard disk drive (HDD) or flash memory.

The processor may also be provided with a number of different inputs allowing the user to interface with the processor 23. In this illustrative embodiment, a microphone 29, an auxiliary input 31 (for input 33), a USB input 35, a GPS input 37 and a BLUETOOTH input 39 are all provided. An input selector 41 may also be provided, to allow a user to swap between various inputs. Input to both the microphone 29 and the auxiliary connector 31 is converted from analog to digital by a converter 43 before being passed to the processor 23.

Outputs to the system can include, but are not limited to, a visual display 21 and a speaker 45 or stereo system output. The speaker may be connected to an amplifier 47 and may receive its signal from the processor 23 through a digital-to-analog converter 49. Output can also be made to a remote BlueTooth device such as PND 51 or a USB device such as vehicle navigation device 53 along the bi-directional data streams shown at 55 and 57 respectively.

In one illustrative embodiment, the system 20 uses the BlueTooth transceiver 39 to communicate 59 with a user's nomadic device 61 (e.g., cell phone, smart phone, PDA, etc.). The nomadic device 61 can then be used to communicate 65 with a network 67 outside the vehicle 70 through, for example, communication 63 with a cellular tower 69.

Exemplary communication between the nomadic device 61 and the BlueTooth Trasceiver 39 is represented by signal 71.

Pairing a nomadic device 61 and the BlueTooth transceiver 39 may be instructed through a button 73 or similar input, configuring the transceiver for pairing with a BlueTooth transceiver in a nomadic device.

Data may be communicated between CPU 23 and network 67 utilizing, for example, a data-plan, data over voice, and/or any suitable modulation technique as is well known in the art. Alternatively, it may be desirable to include an onboard modem 75 in order to transfer data between CPU 23 and network 67 over the voice band.

In one illustrative embodiment, the processor 23 is provided with an operating system including an API to communicate with modem application software. The modem application software may access an embedded module or firmware on the BlueTooth transceiver to complete wireless communication with a remote BlueTooth transceiver (such as that found in a nomadic device). In another embodiment, nomadic device 61 may include a modem for voice band or broadband data communication. In the data-over-voice embodiment, a technique known as frequency division multiplexing may be implemented when the owner of the nomadic device 61 can talk over the device while data is being transferred. At other times, when the owner is not using the device, the data transfer can use the available voice channel bandwidth (300 Hz to 3.4 kHz in one example).

Alternatively, if the user has a data-plan associated with the nomadic device, it is possible that the data-plan allows for broad-band transmission and the system could use a much wider bandwidth (speeding up data transfer). In still another embodiment, nomadic device 61 is replaced with a cellular communication device (not shown) that is affixed to vehicle 31. In yet another embodiment, the ND 61 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BlueTooth transceiver and into the vehicle's internal processor 23. In the case of certain temporary data, for example, the data can be stored on the HDD or other storage media 27 until such time as the data is no longer needed.

Additional sources that may interface with the vehicle include a personal navigation device 51, having, for example, a USB connection 56 and/or an antenna 58 or a vehicle navigation device 53, having a USB 62 or other connection, an onboard GPS device 37, or remote navigation system (not shown) having connectivity to network 67.

Further, the CPU 23 could be in communication with a variety of other auxiliary devices 77. These devices can be connected through a wireless 79 or wired 81 connection. Also, or alternatively, the CPU 23 could be connected to a vehicle based wireless router 85, using for example a WiFi 83 transceiver. This could allow the CPU 23 to connect to remote networks in range of the local router 85.

Referring back to FIG. 1, simulated vehicle computing system 3 may be connected (e.g., electrically or wirelessly) to a nomadic device (ND) 5. ND 5 may be, without limitation, a cellular phone, wireless LAN device, or a PDA. ND 5 may receive and store directional or route data from a service delivery network (SDN) 7 using, in one non-limiting embodiment, a data over voice (DoV) line. The route data received by the ND 5 may be processed and transmitted to the simulated vehicle computing system 3.

Figure 3:
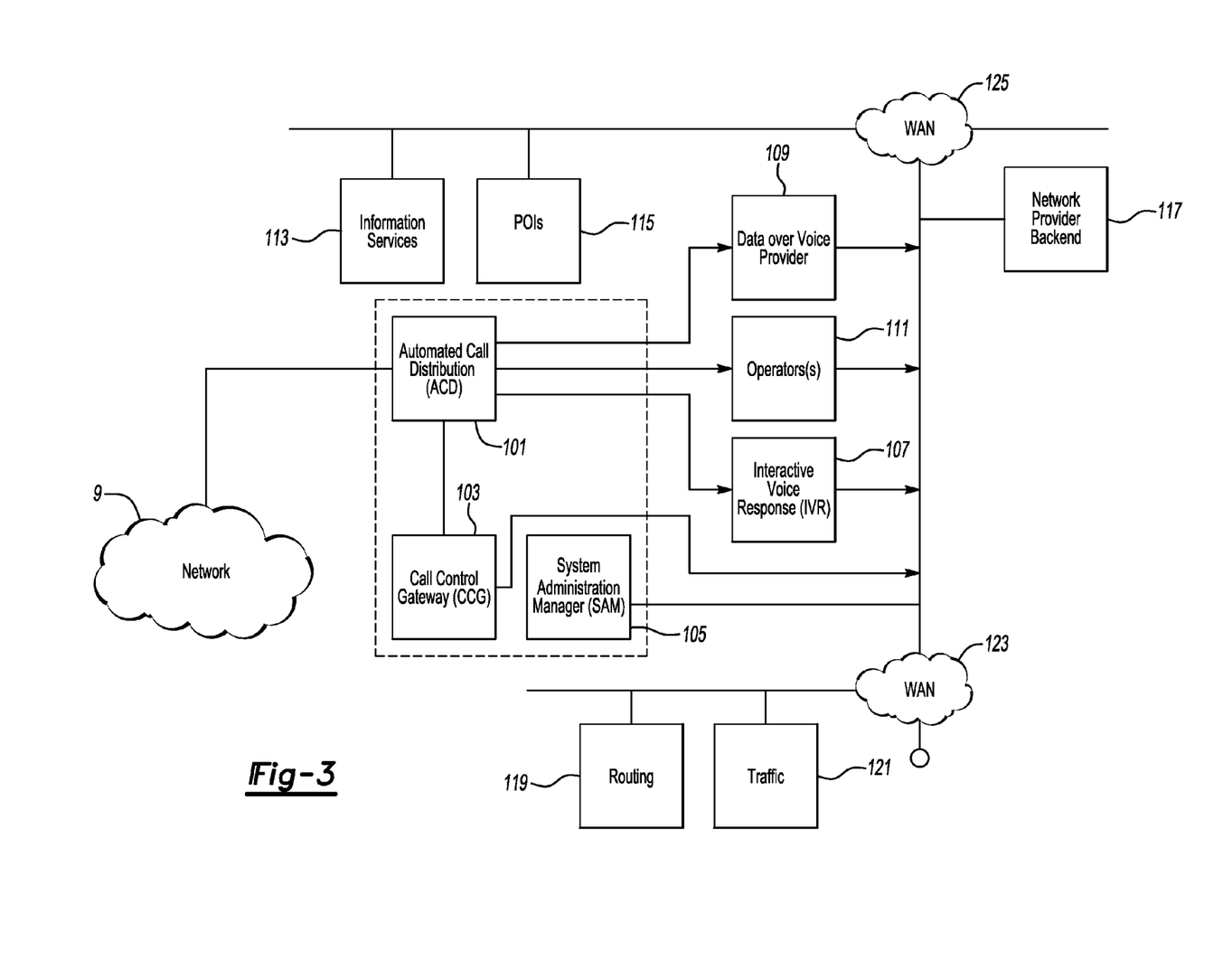
FIG. 3 is an exemplary illustration of a service delivery network according to one of the various embodiments.

FIG. 3 shows an illustrative example of a SDN 7. It should be understood that the disclosure of FIG. 3 may be modified or re-arranged to best fit a particular implementation of the present invention. The simulated vehicle communication system 3 may connect to the SDN 7 through, for example, network 9 using ND 5. Data between the ND 5 and the SDN 7 may travel over the network 9 which may be a telecommunications network (e.g., and without limitation, a cellular network). In one embodiment, network 9 may also be a broadband wireless network (e.g., and without limitation, a WiFi or WiMax network). Accordingly, the simulated vehicle communication system may also connect through a variety of other networks, such as through a local network if it is connected to a router.

As illustrated in one or more embodiments, when a connection arrives at the SDN 7 (from, e.g., ND 5), it is handled by an Automated Call Distributor (ACD) 101. An exemplary illustrative non-limiting ACD 101 may consist of hardware for terminals and switches, phone lines, software for a routing strategy, etc.

In this illustrative embodiment, the ACD 101 may be a device that may route or distribute incoming calls according to one or more routing strategies. Routing strategies may be a rule based set of instructions that instruct the ACD 101 on the handling of calls inside the SDN 7 so that the best available resources for an incoming call or connection can be identified. Non-limiting examples of routing strategies may include routing calls to terminals used by one or more operators, interactive voice response (IVR) systems that communicate with callers, or modem pools for extracting electronic data, and other non-limiting resources.

In addition to an ACD 101, a call control gateway (CCG) 103 may be provided to manage the resources of the ACD 101 and aid in resource allocation to incoming calls/connections. Other resources assigned to the network may also be managed by a CCG 103.

For example, in one illustrative embodiment, the CCG 103 may create a unique session identification number and may utilize that number to be able to transfer a call between various resources, depending on, for example, the caller's needs within the SDN 7. Accordingly, calls that need to be moved between the various components of the SDN 7 may be assigned, monitored, and serviced through a CCG 103 through, e.g., rules and tables created by the CCG 103.

A system administration manager (SAM) 105 may also be provided to the SDN 7. Among other things, the SAM 105 may be responsible for the security and certification of users, callers, applications and the services on the SDN 7. The SAM 105 may have direct access to a customer database and may be responsible for allowing or denying services to callers based on, for example, criteria assignable to each caller's account.

The SAM 105 may also be used to pull reports, records, usage patterns (both locally and remote), etc. The SAM 105 may also be able to store and update individual user records. These records can be used in a variety of fashions, including ACD 101 intelligent call routing and charging for chargeable services.

As stated above, one of the applications to which a call may be routed is the IVR system 107. The IVR system may be an automated telephone information system that speaks to a caller using a combination of fixed voice menus and data extracted from a database in real time. For example, the system may welcome the caller with the fixed word "hello" followed by the caller's name "Susan" that it dynamically pulled from a database.

The caller may respond to questions and menus presented by the IVR by speaking or pressing keyed buttons. Additionally, a spoken command by the caller may be translated by the simulated vehicle communication system 3 and sent in the form of a DTMF tone for a particular key. The caller may also be able to speak short phrases which may be understood by the IVR.

In one embodiment, voice portals, systems fronted by speech recognition software, may be designed and integrated into an IVR to help a user obtain desired information.

Another service to which the calls may be routed is a data over voice (DOV) provider 109. The DOV providers may provide a mechanism to send and receive data across a voice channel.

In addition to the listed network components, the SDN 7 may be connected to a Network Provider Backend 117. This backend may provide system services, and may also be used by the network provider to directly access the system.

Also connected to the SDN 7 in this illustrative embodiment may be information services 113 to provide requested information to callers, a POI database 115 to provide points of interest to drivers, a routing engine 119 to assist with navigation directions, a traffic database 121 to provide traffic information, and operators 111 to assist callers.

In one embodiment, the SDN 7 may connect to one or more of these additional services through WANs 123, 125, where one or more of these services may be provided by alternative providers. It should be understood, however, using one or more of the WAN connection(s) 123, 125, the components described above may together comprise the SDN 7.

Referring back to FIG. 1, system 1 may also include network 13 which may be a wired or wireless broadband connection. Non-limiting examples of a wireless connection may include WiFi (e.g., an 802.11 standard connection) or WiMax.

Network 13 may be used to access one or more mapping services 15 via an Internet connection. The service may or may not be accessible using a standard web browser (e.g., INTERNET EXPLORER distributed by The Microsoft Corporation). A non-limiting example of a mapping service is one offered by Google, Inc., such as GOOGLE EARTH. The mapping service 15 may transmit mapping data to terminal 17. Mapping data may include, but is not limited to, GPS data and map data (i.e., graphical representations of maps).

Map data may be displayed or otherwise provided at terminal 17 to follow the route which is being tested. In one embodiment, terminal 17 may serve as a GPS puck for receiving and transmitting GPS data received from the mapping service 15. Furthermore, terminal 17 may be used to validate the route of the directions being tested.

Terminal 17 may be connected to the simulated vehicle computing system 3 via wired (e.g., and without limitation, a USB connection) or wireless (e.g., and without limitation, BLUETOOTH) connection 11a for simulating aspects of FIG. 2. Terminal 17 may also be connected to simulated vehicle computing system 3 using an on-board diagnostics (e.g., OBD-I or OBD-II) interface 11b for receiving commands from and transmitting commands to a controller area network (CAN) 10 or other data bus within the simulated vehicle computing system 3. For example, as will be described in further detail below, the one or more GPS signals received from the mapping service 15 may be transmitted to the CAN via, e.g., an OBD-II interface for receiving GPS data at the simulated vehicle computing system 3.

As illustrated (without limitation), system 3 may have installed navigation simulation software 19. Alternatively, the navigation simulation software may be installed on terminal 17. In one non-limiting embodiment, the navigation simulation software 19 may receive one or more inputs from a user for simulating a "drive" along the route. The inputs may include, but are not limited to, keyboard inputs, mouse clicks and voice commands. As the user simulates the "drive" (described below), location changes to the GPS data may be transmitted to the simulated vehicle computing system 3. At each change, the simulated vehicle computing system 3 may output a new directional step from one or more speakers. Alternatively or additionally, the new directional step may be outputted to terminal 17. The output may be text-based (e.g., displayed at terminal 17) or an audible output (e.g., and without limitation, a machine-spoken output). The simulation software 19 may be stored to non-volatile memory of system 3 or, alternatively within terminal 17.

It should be understood that while FIG. 1 illustrates communication between system 3 and terminal 17, the exemplary topology is for illustration and clarity purposes and, therefore, the architecture of system 1 is non-limiting. For example, the various embodiments described herein may operate on system 3 or terminal 17 without deviating from the scope of the invention. Furthermore, there may be one or more of system 3 and/or terminal 17.

The mapping service 15 may include an application programming interface (API) through which the navigation simulation software 19 may communicate with the mapping service in order to use one or more mapping functions. The mapping service API may be downloaded in one embodiment, to terminal 17. Furthermore, in one embodiment, a web browser plug-in may be installed at terminal 17 to provide one or more mapping functions received from mapping service 15. As is known in the art, plug-ins are computer programs that provide specific services to host applications (such as a web browser).

Figure 4:
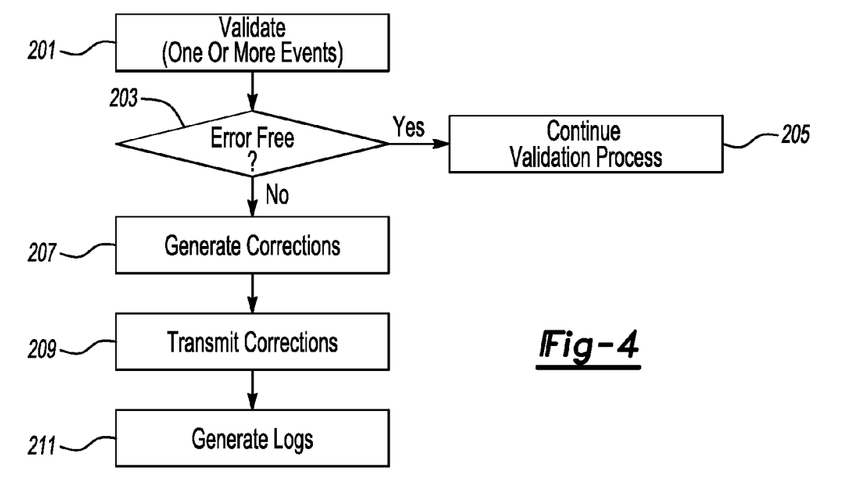
FIG. 4 shows one aspect of the validation process for testing navigation routes according to one of the various embodiments.

FIG. 4 illustrates the validation operation for validating navigational directions according to one of the various embodiments. The disclosure of FIG. 4 may be modified or re-arranged to best fit a particular implementation of the present invention.

Figure 7:
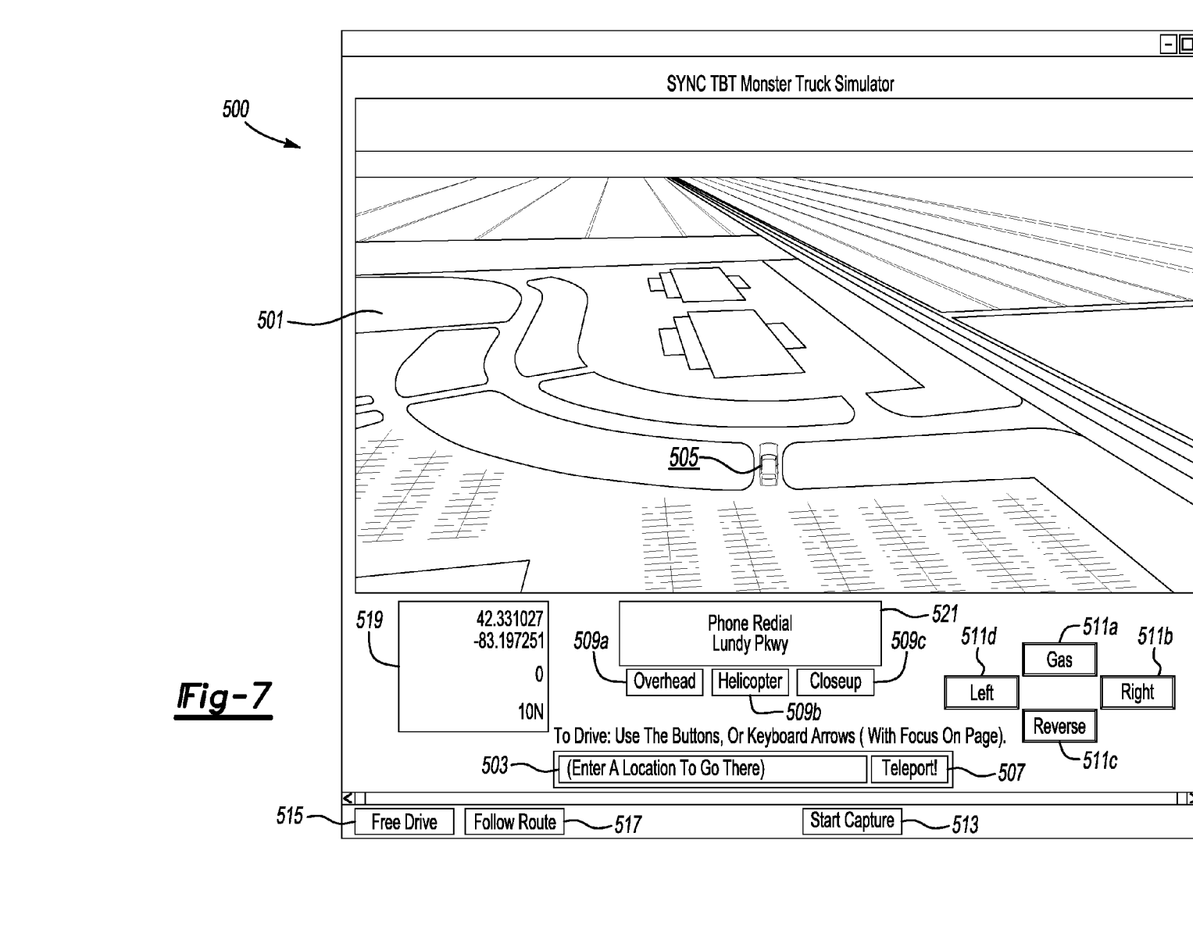
FIG. 7 is an exemplary graphical user interface for testing navigation routes according to one of the various embodiments.

During the route validation process, a user may validate the simulated navigation of the route, as illustrated in block 201, by operating, in one non-limiting embodiment, vehicle directional controls (e.g., controls 511a-d of FIG. 7). For example, as will be described below, upon notification by the simulated vehicle computing system 3 of a new directional step or another change in route, the user may validate the accuracy of the proposed new directional step from a map display (e.g., display 501 of FIG. 7). Validation may include, but is not limited to, determining the accuracy of the simulated vehicle computing system's 3 navigational output, logging navigational errors, generating proposed corrections and transmitting the proposed corrections for implementation.

As will be described below with respect to FIG. 6, in one non-limiting embodiment, the validation process may include a user controlling along the route a virtual vehicle from an input device connected to terminal 17 (e.g., and without limitation, a keyboard, mouse, or a microphone). Data representing the user-controlled route may be communicated from terminal 17 to simulated vehicle computing system 3. As the virtual vehicle travels along the route, the simulated vehicle computing system 3 may output one or more directional steps to complete along the route. Accordingly, based on the output, the user may validate the accuracy of the system's 3 navigation of the route in view of a map display at terminal 17. In another non-limiting embodiment, as described with respect to FIG. 8, the validation process may include storing the route to memory (at system 3 or terminal 17) and validating the route based on playback of the stored route.

As illustrated in block 203, the validation step may further include a determination of the propriety of the system's 3 output navigation instructions. If no errors are found in the system's 3 route navigation, the validation process may continue as illustrated in block 205. If one or more errors exist in the system's 3 navigation, the user may generate corrections for the errors as illustrated in block 207. In an alternative embodiment, corrections may be defined by terminal 17 based on basic principles of travel and navigation in view of the available navigation options.

A non-limiting example of an error for which a correction may be generated may include the system 3 failing to output a particular turn while navigating the route (i.e., either in response to user input or during playback). As illustrated in block 209, error correction may include electronically transmitting the corrections to a third-party for correction. Error correction may also include, but is not limited to, re-programming navigational software to cure the one or more errors or transmitting the corrections to navigational software as updates or "fixes."

In one embodiment, as illustrated in block 211, one or more error logs and/or error correction logs may be generated. The logs may be stored to terminal 17 or one or more servers (not shown) in communication with system 1.

Figure 5:
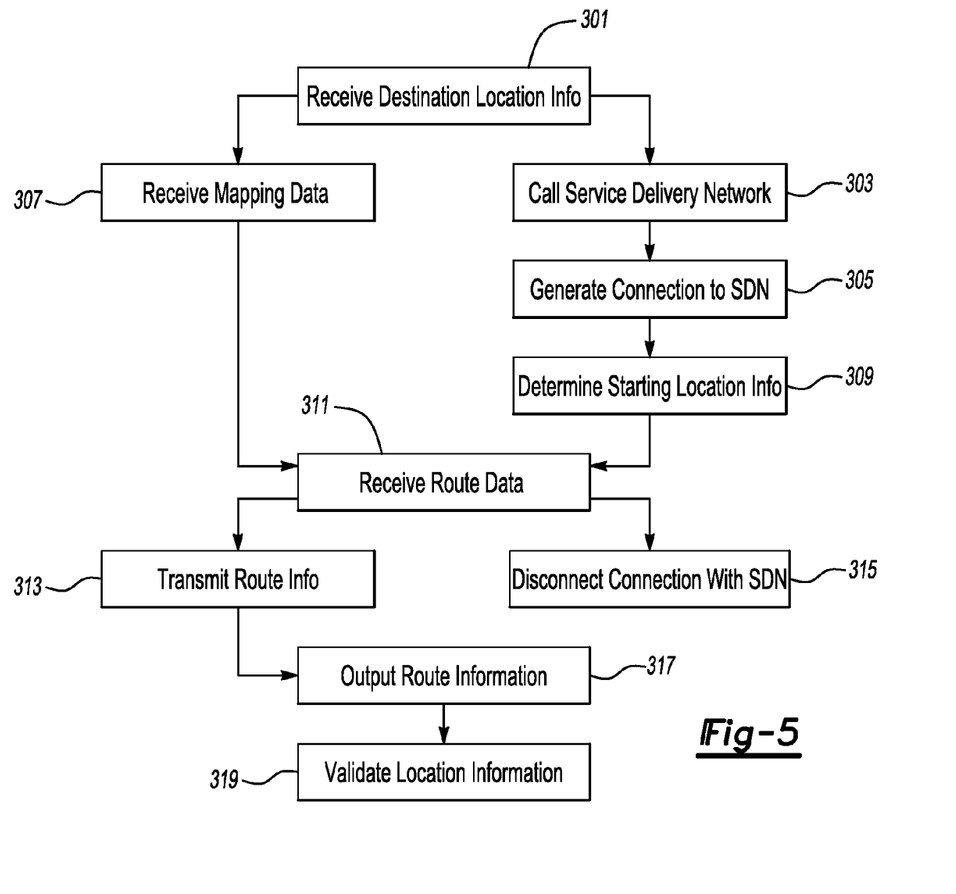
FIG. 5 shows another aspect of the validation process for testing navigation routes according to one of the various embodiments.

FIG. 5 illustrates one aspect of the validation process for validating navigational directions according to one of the various embodiments. As illustrated in block 300, one or more destination addresses may be received from a user at simulated vehicle computing system 3. The one or more addresses may be entered automatically or using voice input or manual input (e.g., and without limitation, a keyboard).

The validation process may include calling the SDN 7, as illustrated in block 303, to receive route data based on the user's location information and the inputted address. The call may be made by ND 5. The connection to the SDN 7 may be generated as illustrated in block 305 by ND 7. The route data may be received from routing engine 119 (FIG. 3) of the SDN 7 upon making the connection.

As illustrated in block 307, mapping data may be received from the mapping service 15. In one embodiment, mapping data may be received by terminal 17 which may transmit the GPS information to simulated vehicle computing system 3 via a USB input 11a to the OBD-II interface for transmission to the CAN 10.

GPS information from the mapping service 15 may be received automatically or manually (e.g., via user input) for determining starting location information. In one embodiment, the same or separate mapping data may also be used to retrieve starting location information for the route data from the SDN 7. Thus, as illustrated in block 309, starting location information may also be determined.

As illustrated in block 311, the route data may be received from the SDN 7. In one embodiment, the route data may be received by the ND 5. The ND 5 may store the route data in non-persistent or volatile memory (not shown). The route data may be transmitted to the simulated vehicle computer system 3 as illustrated in block 313. In one embodiment, before or after transmitting the route data to the simulated vehicle computing system 3, the connection with the SDN 7 may be terminated as illustrated in block 315.

The simulated vehicle computing system 3 may output the route information as illustrated in block 317. The output may be an audible, textual, or data output. A non-limiting example of an audible output may include a speech-based output. The output may include, but is not limited to, one or more steps in the route information, a route summary, the starting location and/or the destination location. The outputted route information may be validated as illustrated in block 319 (which will be described below).

The validation process of one or more routes will be described with respect to FIG. 6. The operation illustrated in FIG. 6 may occur at simulated vehicle computer system 3, terminal 17, or by system 3 and terminal 17. Furthermore, the validation process may include, in one non-limiting embodiment, a virtual vehicle "driven" along a digitized map. It should be understood that a virtual vehicle is exemplary and other virtual objects and figures may be used without departing from the scope of the various embodiments. In another non-limiting embodiment, the validation process may alternatively or additionally include text based directions.

The system 3 and/or terminal 17 may communicate with simulation software 19 for accomplishing the validation process. For illustration purposes, the operation is performed on the simulated vehicle computing system 3.

As illustrated in block 401, the mapping data from mapping service 15 may be received. In one embodiment, the mapping data may be received during the process described above with respect to FIG. 5. As illustrated in block 403, the validation process may include user input received at system 3. User inputs may include, but are not limited to, key presses (e.g., at a keyboard or on a touch screen), mouse clicks, or voice commands.

The user input may control the virtual vehicle along the digitized route as illustrated in block 405. In an alternative embodiment, the virtual vehicle may be automatically controlled according to one or more pre-defined or random vehicle control algorithms. In this embodiment, the algorithms may operate the virtual vehicle along existing road and traffic patterns.

As the virtual vehicle is "driven" along the route, mapping data may continue to be received at system 3 from mapping service 15 as illustrated in block 407. Furthermore, as the virtual vehicle moves along the route, route information (e.g., a new route step) may be received/output by the simulated vehicle computing system 3 (block 317 of FIG. 5). As route information is received/output, there may or may not be an output relative to the route information. Each output (or lack of output) may create a route validation opportunity.

A determination may be made whether any route issues exist as illustrated in block 409. If there is no route issue, the user/computer may continue to validate the system's 3 navigation of the route, as illustrated in block 411, as the vehicle continues to move along the route (e.g., via user input), as illustrated in block 405.

If there is a route issue, one or more determinations may be made to identify the issue. For example, a determination may be made whether the vehicle is off-route as illustrated in block 413. A virtual vehicle may be taken off-route in order to validate the system's 3 navigation of the detour. If the virtual vehicle is off-route, the user/computer may wait or listen for an alert (e.g., an audible alert) from the simulated vehicle computing system 3 regarding the off route status as illustrated in block 415. As one non-limiting example of an alert, the system 3 may alert (e.g., and without limitation, announce in a spoken language) that the vehicle is off route. In another non-limiting example of an alert, the system 3 may output route information for finding the original route. Accordingly, as illustrated in block 417, the system's 3 navigation of the route and its outputs (or lack of outputs) may be validated (FIG. 4) while navigating the route.

If the virtual vehicle is not off route, a determination may be made of other issues, for example, whether there is a new step in the route (e.g., a new turn) as illustrated in block 419. If there is a new step in the route, the user/computer may wait or listen for one or more outputs from the simulated vehicle computing system 3 identifying the new step as illustrated in block 421. Accordingly, the user may validate (FIG. 4) the system's 3 navigation of the route based on one or more new steps as illustrated in block 423.

If the route does not include a new step, the validation process may continue by identifying other possible issues as illustrated in block 425. Identification may be made automatically or by a user. Non-limiting examples may include unrecognizable street names, road name changes or the removal of streets, and changing of a road from/to a one-way street. Another non-limiting example may include inappropriate timing for guidance (e.g., and without limitation, early or late guidance). Validation of the route may continue based on one or more other issues as illustrated in block 411. It should be understood that FIG. 6 is for illustration purposes and that route issues may be determined in any order (i.e., not necessarily in the order illustrated in FIG. 6).

FIG. 7 illustrates an exemplary interface displayed to a user during the validation process. Image 501 may be a digitized map or a satellite image of a particular location. In this non-limiting illustration, image 501 is a satellite image. Image 501 may include the virtual vehicle 505.

The user may enter one or more starting locations where a route is to be tested/validated in data entry field 503. Non-limiting examples of inputs to field 503 may include a full address, a city and state, zip code, or a point of interest (e.g., and without limitation, a name of a commercial establishment). By selecting selectable button 507, an image (satellite or digitized map) of the location may be displayed at image 501. For example, if the user inputs "123 Main Street, San Francisco, Calif. 90875" into field 503 and selects button 507, an image of the inputted address may be displayed at image 501.

In one embodiment, the starting location may be saved on a server (not shown) such that route validation may be saved and continued at a later time. Route validation information may be saved as one or more executable files on the server. Accordingly, at entry field 503, a user may enter the file location address (e.g., and without limitation, using a "browse" button known in the art for retrieving files) for retrieving the one or more executable files. The route may be saved to a server at any time during the validation process.

Referring back to FIG. 7, the user may "steer" the virtual vehicle 505 using one or more input devices including, but not limited to, a keyboard, mouse, microphone (e.g., for voice commands), touch screen, and the like. As represented in FIG. 7 for illustrative purposes, the display 500 may include one or more steering control buttons 511a-d for controlling the virtual vehicle when using, for example, a mouse device. "Gas" button 511a may be to move the virtual vehicle 505 forward, "right" button 511b may be to turn right, "reverse" button 511c may be to reverse the virtual vehicle 505, and "left" button 511d may be to turn left.

Display 500 may include other inputs. For example, selectable button 513 (labeled for illustrative purposes as "Start Capture") may be selected for recording the route data and the validation process. The recorded data may be used for later playback as will be described with respect to FIG. 8. Selectable button 515 (labeled for illustrative purposes as "Free Drive") may be selected when the system is being used under non-testing circumstances. Selectable button 517 (labeled as "Follow Route" for illustrative purposes) may be selected to begin the validation process.

In one embodiment, multiple views of image 501 may be displayed to the user. Non-limiting examples may include an overhead view (represented by button 509a), helicopter view (represented by button 509b), closeup (represented by 509c), and street view (not shown).

Display 500 may also include one or more status areas. Status area 519 may be a virtual speedometer. As the user selects one of steering buttons 511a-d, status area 519 may display the speed at which the virtual vehicle is travelling (in this embodiment, represented by "0"). In one embodiment, the speed at which the virtual vehicle 505 is travelling may correlate with the system's 3 response time. For example, the faster the virtual vehicle 505 travels, the faster system 3 may output a response. In another embodiment, the velocity (or virtual velocity) of the vehicle may be different than the velocity of the system 3.

Display 500 may also include a compass. In this non-limiting embodiment, the compass is in status area 519 (represented by "10N"). Status area 519 may also include latitude and longitude data.

Display 500 may also include status area 521 which may identify the current location of the virtual vehicle. In this illustrative embodiment, the current location is "Lundy Pkwy." Status area 521 may additionally or alternatively include distance information. For example, and without limitation, status area 521 may state that "Ford Road" is 100 feet away or that the destination has been reached.

It should be understood that status areas 519 and 521 are exemplary. Display 500 may include one or more status areas. Furthermore, there may be more or less information provided in the status areas, and the information may be arranged in any manner as is convenient and aesthetically pleasing to one practicing in the art.

Figure 8:
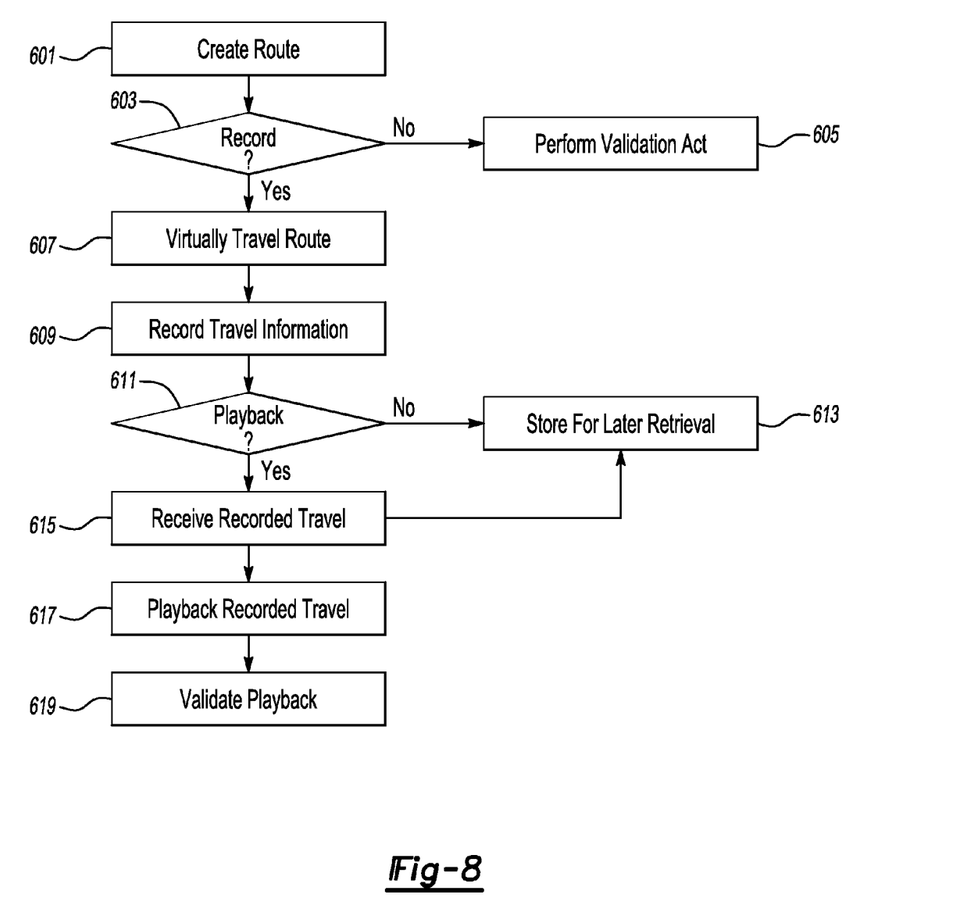
FIG. 8 shows another embodiment for testing navigation routes according to the various embodiments.

In one embodiment, as illustrated in FIG. 8, routes may be recorded (and stored in, for example, terminal's 17 and/or system's 3 non-volatile memory) for future playback and regression testing. The route may be generated as illustrated in block 601 as described in one or more embodiments above.

A determination may be made whether to record the route (for example, and without limitation, based on the user's selection or non-selection of selectable button 513) as illustrated in block 603. If navigation of the route is not recorded, other activities may still be accomplished as illustrated in block 605 (e.g., "free drive or validation of the route as described in one or more embodiments above). If navigation of the route is recorded, the route may be navigated manually (e.g., by the user) or automatically as illustrated in block 607 and the route navigation may be recorded to memory as illustrated in block 609.

After one or more routes have been navigated, a determination may be made whether the route(s) are to be played back as illustrated in block 611. The determination may be based on input (e.g., selection by a user to play back the route or a configuration of software 19 to automatically playback upon recording one or more routes). If a route is not played back, the route(s) may be stored for later retrieval as illustrated in block 613. If the route(s) are played back, the recorded navigation of the route(s) may be retrieved/received from memory as illustrated in block 615.

The route navigation(s) may be played back as illustrated in block 617. As illustrated in block 619, a user may then use the played back route(s) for regression testing. Regression testing may occur in any manner as is known and practiced in the art.

Figure 9:
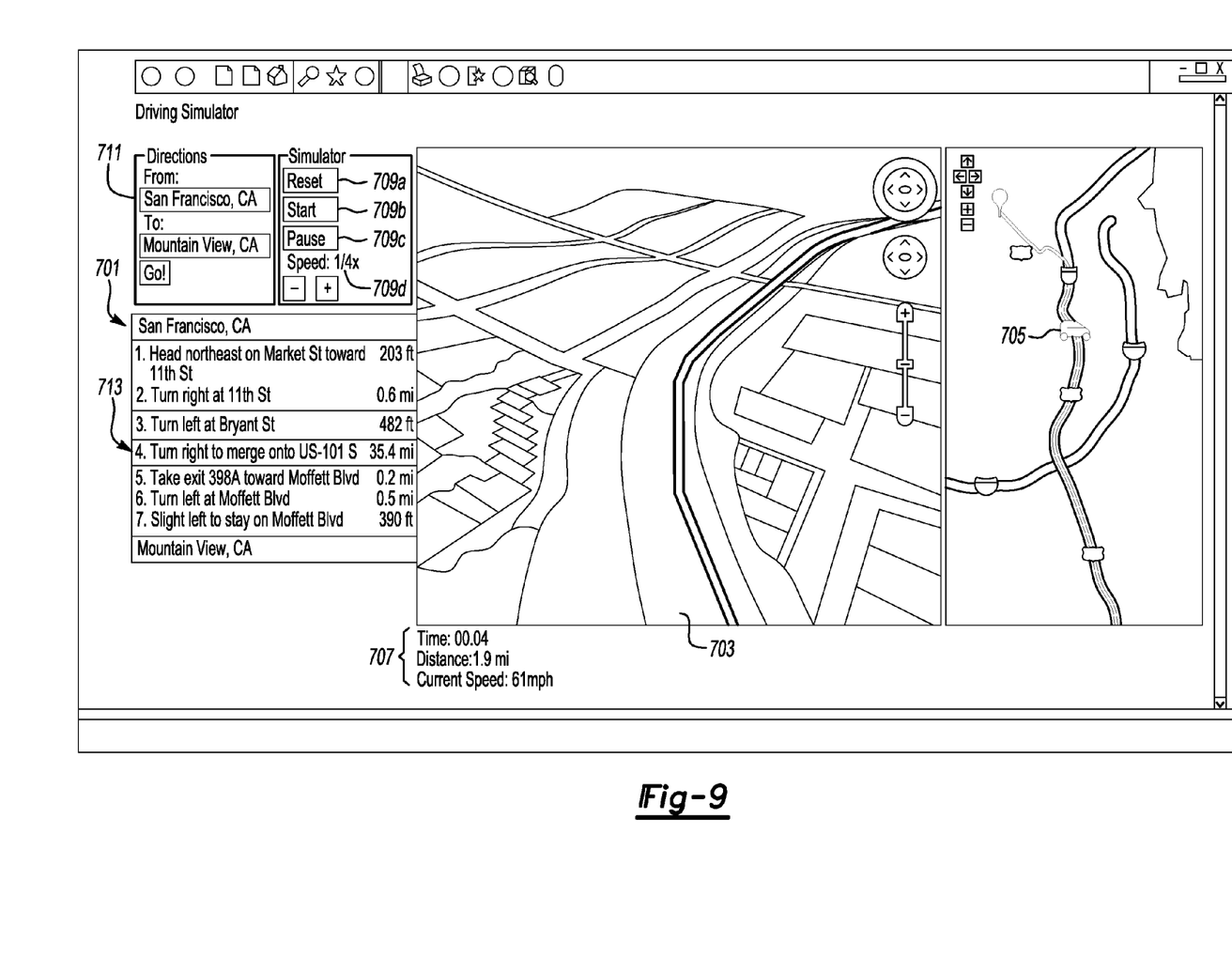
FIG. 9 is an exemplary graphical user interface for testing navigation routes according to another one of the various embodiments.

FIG. 9 shows an exemplary display 701 that may be displayed to a user during recorded playback of navigated route(s). Image 703 which may include satellite images, digitized maps, or both. Image 703, in one embodiment, may include a virtual vehicle 705. Display 701 may also include status information 707.

The user may control the playback of the route navigation(s) using one or more of buttons 709*a-d*. In this non-limiting embodiment, the user may select button 709*a* (labeled for illustration purposes as "Reset") for resetting the playback. The user may also select button 709*b* (labeled for illustration purposes as "Start") for activating the playback. The user may also select button 709*c* (labeled for illustration purposes as "Pause") for pausing route validation. The user may also select button(s) 709*d* (labeled for illustration purposes as "Speed") to control the speed of the playback.

In one embodiment, display 701 may also include input field(s) 711 for retrieving the recorded route(s). For example, in this illustrative embodiment, the retrieved route is from "San Francisco, Calif." to "Mountain View, Calif." Display 701 may also include textual route information 713 based on the inputs entered into field(s) 711. In one embodiment, if a route is not identified based on the user's input into field 711, a message may be displayed (not shown) stating that no recorded route exists.

In one embodiment, navigation validation as described in one or more embodiments above may be accomplished automatically (i.e., without user intervention). That is, the validation process may occur as one or more batch processes. The batch processing may be programmed to occur at predetermined intervals. Non-limiting examples may include daily, monthly, bi-annually, or yearly.

Simulation software 19 may include programmed instructions for automatically accomplishing the validation process including aspects described above. Simulation software 19 may test the routing data based on geographic coordinates (i.e., latitude and longitude) received from the SDN 7 representing the routing data. With reference to FIG. 7, as the virtual vehicle 505 moves along a route, simulation software 19 may receive the coordinates of the vehicle 505 based on the map data. Simulation software 19 may compare the moving coordinates of the vehicle with the coordinates associated with the routing data to test the system's accuracy in navigating the route. If a discrepancy is determined between the coordinates of the routing data and the coordinates received from mapping service 15, software 19 may generate a log of errors. The log may be reviewed by a user for error correction as described above. Alternatively, the software 19 may correct the route error based on mapping information. The correction may be based on available information on the street route(s) to the destination specified. Where multiple routes are available, methods are known in the art to rank and select the fastest and/or most suitable route.

Figure 6:
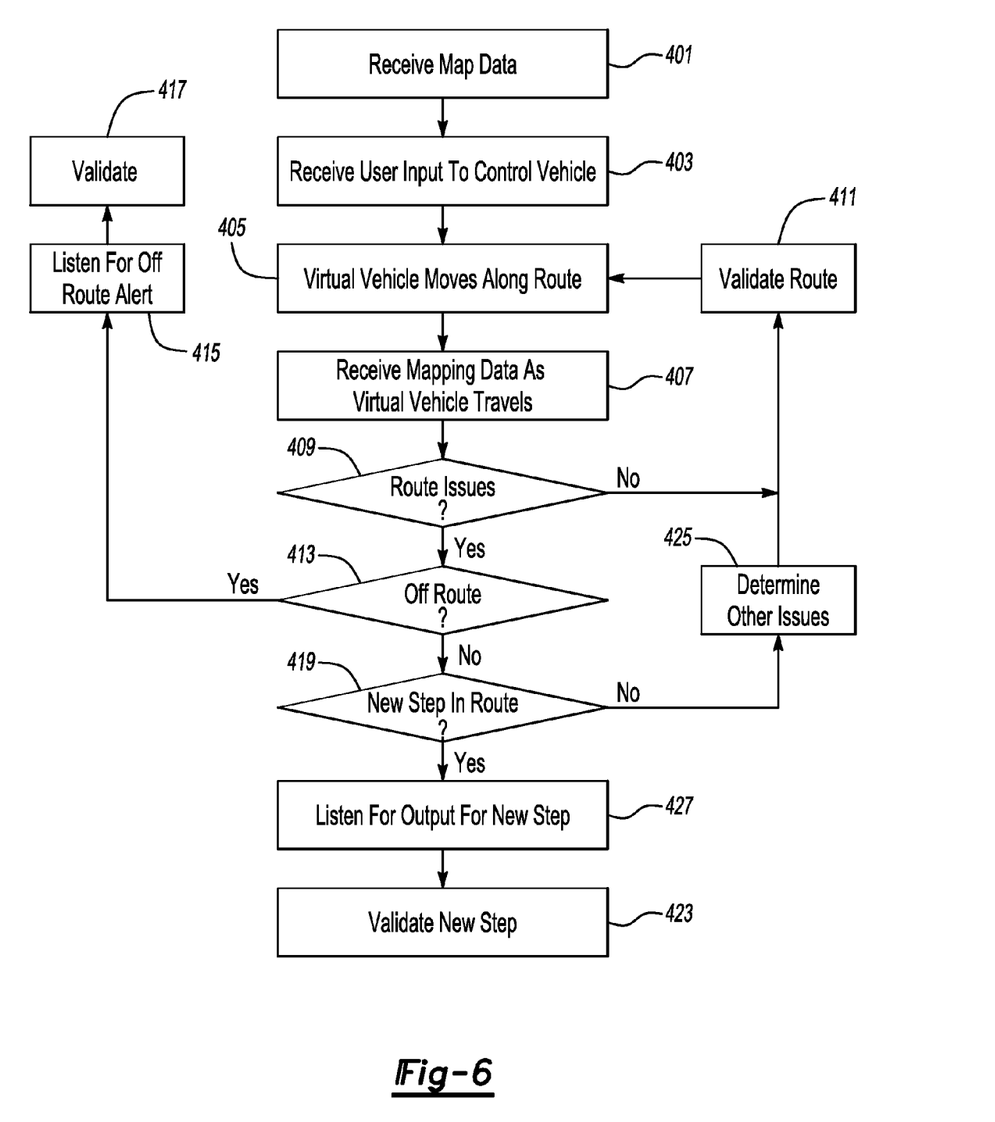
FIG. 6 shows another aspect of the validation process for testing navigation routes according to one of the various embodiments.

In one embodiment, software 19 may be programmed with instructions for automatically generating one or more route issues in order to automatically test route issues as described with respect to FIG. 6.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
   inputting a starting and destination location to a computerized vehicle navigation system;
   receiving at the vehicle navigation system route and GPS information based on the starting and destination location;
   simulating vehicle travel along a route determined by navigation instructions from the navigation system; and
   comparing the navigation instructions to actual map information to validate the accuracy of the navigation instructions.

2. The method of claim 1 further comprising:
   changing a vehicle route;
   receiving second navigation instructions based on the change in route; and
   comparing the second navigation instructions to the map information to validate the accuracy of the second navigation instructions.

3. The method of claim 2, wherein the second navigation instructions are invalid at at least one point, if no change in navigation instructions results from the change in route, and wherein the method further includes correcting the second navigation instructions to include a change in navigation instructions based on the change in route.

4. The method of claim 1, further comprising:
   simulating an off-route condition;
   receiving second navigation instructions based on the off-route condition; and
   comparing second navigation instructions to the map information to validate the accuracy of the second navigation instructions.

5. The method of claim 4, wherein the second navigation instructions are invalid at at least one point, if no change in the second navigation instructions results from the off-route condition, and wherein the method further includes correcting the second navigation instructions to include the optimal turn.

6. The method of claim 1, wherein the navigation instructions are invalid at at least one point, if an optimal turn in the map data is ignored by the navigation instructions, and wherein the method further includes correcting the navigation instructions to include the optimal turn.

* * * * *